Nov. 3, 1925.

M. J. TRUMBLE

VALVE

Filed Oct. 16, 1922

1,559,811

INVENTOR:
MILON J. TRUMBLE,
BY
ATTORNEYS.

Patented Nov. 3, 1925.

1,559,811

UNITED STATES PATENT OFFICE.

MILON J. TRUMBLE, OF ALHAMBRA, CALIFORNIA, ASSIGNOR TO BROWN VALVE AND MANUFACTURING CO., OF ALHAMBRA, CALIFORNIA, A CORPORATION OF CALIFORNIA.

VALVE.

Application filed October 16, 1922. Serial No. 594,759.

*To all whom it may concern:*

Be it known that I, MILON J. TRUMBLE, a citizen of the United States, residing at Alhambra, in the county of Los Angeles and State of California, have invented a new and useful Improvement in Valves, of which the following is a specification.

This invention relates to flow regulating devices and particularly to valve means for controlling the flow of liquid substances, especially those which carry abrasive materials in suspension. Although the valve has a particular utility as an outlet valve for controlling the flow of sand bearing oil from gas traps and similar devices which are employed in the petroleum oil producing industries, it is of utility with other fluids.

It is an object of the invention to provide a valve which will not be materially affected in operation by the presence of sand in the liquid flowing therethrough.

It is a further object of the invention to provide a valve which will maintain a substantially tight closure under varying conditions of pressure.

It is a further object of the invention to provide in this valve an arrangement in which the wear receiving parts may be quickly and cheaply renewed.

It is a further object of the invention to provide a valve of this character which is extremely simple in construction and therefore economical of manufacture.

It is a further object of the invention to provide a valve having a spring retained closure plate and means for moving the closure plate over the discharge opening.

The particular advantages of the invention and further objects thereof will be made evident hereinafter.

Referring to the drawing which is for illustrative purpose only,

Figure 2:
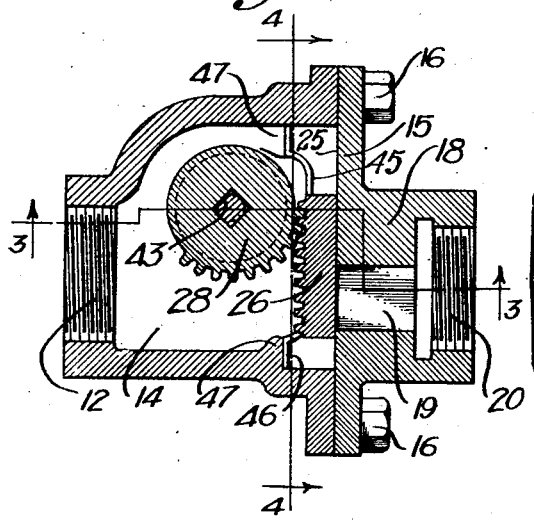
Fig. 2 is a vertical longitudinal section through the valve shown in Fig. 2.
Figure 1:
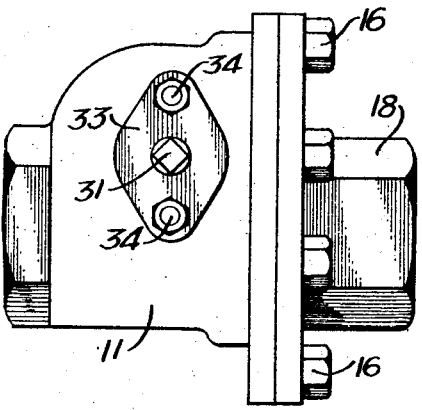
Fig. 1 is an elevational view of a valve embodying the features of the invention.

As shown in the drawing a body 11 is provided having a threaded inlet 12 which leads into a recess 14 adapted to be covered by a cover plate 15 which is secured thereupon by cap screws 16 or other suitable devices. The cover plate 15 has a hub 18 formed thereupon through which the valve outlet passage 19 extends. This passage 19 is enlarged and threaded at the outer end, as indicated at 20, so that a discharge pipe may be attached thereto.

The inner face 25 of the closure plate 15 is machined off to a substantially true and smooth plane, and a closure plate 26 is provided which is adapted to be moved back and forth upon the surface 25 by a gear segment 28, mounted upon a shaft 29, in such a manner that the closure plate may be caused to cover or expose the outlet passage by suitably reciprocating the handle 30 mounted upon the outer ends 31 of the shaft 29 which extends through a packing box 32 provided with a gland 33 which may be tightened down upon the packing contained in the packing box by means of bolts 34.

Figure 3:
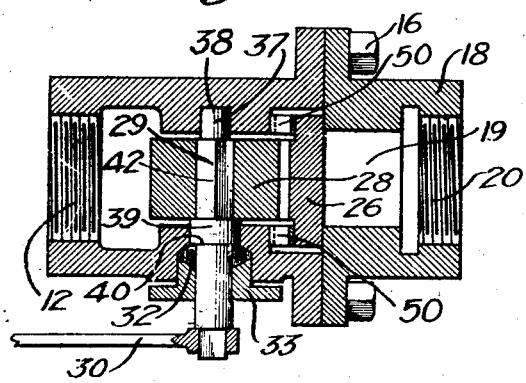
Fig. 3 is a section taken upon a plane represented by the line 3—3 of Fig. 2, and, Fig. 4 is a section taken upon a plane represented by the line 4—4 of Fig. 2.
Figure 4:
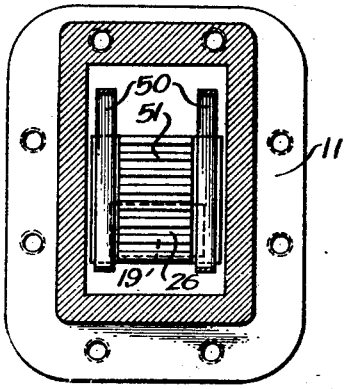

As shown in Fig. 3 of the drawing the inner end 37 of the shaft 29 seats in a recess 38 formed in the wall of the body 11, opposite to the packing box 32. A cylindrical enlargement 39 is provided substantially centrally upon the shaft 29, from which enlargement the outer end 31 of the shaft extends outwardly through the packing box 32 and the gland 33, the packing material being compressed against the shoulder 40 separating the enlargement 39 and the end 31, and being compressed against that portion of the extending end 31 adjacent to the shoulder 40, thus accomplishing a liquid seal around the shaft 29 and further holding the shaft 29 in place due to the compression of the packing against the shoulder 40.

This construction provides a very simple means for installing the gear segment 28 and the shaft 29, as the segment 28 may be placed within the chamber 14 and the squared inner portion 42 of the shaft extended through a squared hole 43 provided in the member 28. With the use of such construction a single packing gland is employed and no additional means are required for maintaining the segment and the shaft 29 in working position.

A particular feature of the invention is the provision of a pair of arch spring members 45, preferably self-retaining, as shown, the ends 46 of which members are received upon shoulders 47 formed in the corners of the recess 14, and the interconnecting arch portions 50 of which bear against the underside of the plate 26, one spring being disposed upon each side of the rack 51 by which engagement of the plate 26 is made with the gear segment 28. When the elements are assembled as illustrated, the arch portions 50 of the spring members are substantially flat, each simultaneously exert substantially the same degrees of pressure upon the closure plate so that there is no tendency of the plate to tilt. It is well known that an arch spring has a greater degree of resiliency at its medial portion than near its ends when said ends are fixed, and it follows that when flexed such end portions will exert a pressure which is greater than that exerted by said medial portion. It will therefore be evident that the curved end portions of the springs 45 will be considerably stiffer than the arch portions 50 and that as the valve plate moves to closed position the springs will exert an increasing pressure against the plate as said plate approaches its closed position and engages the relatively stiffer lower end portions of said springs. This, in effect, provides a valve having the inherent advantages of a wedge-plate valve mechanism, without placing an overburden upon the valve operating mechanism, and without having the wedge-plate tendency to stick.

The particular advantage of the springs 45 is that the closure plate is maintained forcibly against the surface 25 of the cover plate 15 so that a non-leakable closure of the outlet passage 19 is provided no matter what pressure exists in the reservoir from which the liquid is being drawn.

It will be understood that as the pressure behind the closure plate 26 increases, the more tightly it is held over the outlet passage 19, so that the resistance against leakage increases with the pressure exerted upon the liquid being controlled; but where extremely low pressures are being handled, I have found it necessary to employ springs for the purpose of maintaining a tight closure between the closure plate 26 and the surface 25 of the cover plate.

The invention may be employed with various fluid substances, a very valuable use thereof being as a blow-off valve for steam boilers, and may be used successfully with substances of varying densities.

I claim as my invention:

In a sliding plate valve, the combination of: a valve body having an inlet and an outlet and being provided with a valve seat surrounding said outlet; a vertically slidable valve plate normally closing said outlet and having a rack formed on its inner surface; a gear engaging said rack; means for rotating the gear to translate said valve plate; and a pair of imperforate leaf springs maintaining the valve plate against its seat, the respective springs engaging said valve plate on opposite sides of and closely adjacent the rack to form a guide means preventing substantial transverse displacement of the valve plate, said springs exerting a pressure against the valve plate increasing as the valve plate moves to closed position, the interior surface of the valve body being formed for coengagement by the springs to maintain the springs against substantial displacement.

In testimony whereof, I have hereunto set my hand at Los Angeles, California, this 10th day of October, 1922.

MILON J. TRUMBLE.